United States Patent
Hong et al.

(10) Patent No.: US 10,521,257 B2
(45) Date of Patent: Dec. 31, 2019

(54) METHOD, NON-TRANSITORY COMPUTER READABLE RECORDING MEDIUM, AND APPARATUS FOR SCHEDULING VIRTUAL MACHINE MONITOR

(71) Applicant: Foundation of Soongsil University-Industry Cooperation, Seoul (KR)

(72) Inventors: Jiman Hong, Seoul (KR); Taegyu Hwang, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 262 days.

(21) Appl. No.: 15/359,374

(22) Filed: Nov. 22, 2016

(65) Prior Publication Data
US 2017/0192812 A1   Jul. 6, 2017

(30) Foreign Application Priority Data
Dec. 31, 2015 (KR) .......... 10-2015-0190583

(51) Int. Cl.
*G06F 9/455* (2018.01)
*G06F 9/48* (2006.01)

(52) U.S. Cl.
CPC ........ *G06F 9/45558* (2013.01); *G06F 9/4881* (2013.01); *G06F 2009/45579* (2013.01); *G06F 2009/45591* (2013.01)

(58) Field of Classification Search
CPC .. G06F 9/45558; G06F 9/4881; G06F 9/5077; G06F 2009/45579; G06F 2009/45591
See application file for complete search history.

(56) References Cited

U.S. PATENT DOCUMENTS

| 6,964,048 B1 * | 11/2005 | Isham | G06F 9/4887 718/100 |
| 7,065,762 B1 * | 6/2006 | Duda | G06F 9/4887 370/395.4 |

(Continued)

FOREIGN PATENT DOCUMENTS

KR    10-2011-0103257 A    9/2011

OTHER PUBLICATIONS

Kim et al. "Task-aware virtual machine scheduling for I/O performance." Proceedings of the 2009 ACM SIGPLAN/SIGOPS international conference on Virtual execution environments, pp. 101-110 (Year: 2009).*

(Continued)

*Primary Examiner* — James J Lee
*Assistant Examiner* — Willy W Huaracha
(74) *Attorney, Agent, or Firm* — Novick, Kim & Lee, PLLC; Sang Ho Lee

(57) ABSTRACT

A method for scheduling a virtual machine monitor having a scheduler, a task characteristic evaluation unit, and a credit management unit is provided. The virtual machine monitor drives at least two domains. The method includes scheduling, by the scheduler, the at least two domains, if an I/O event of each of the at least two domains in which the scheduling is performed is delayed, evaluating, by the task characteristic evaluation unit, a characteristic of a task of the at least two domains based on at least one of a central processing unit (CPU) intensive degree and an input/output (I/O) intensive degree of the at least two domains, differentially determining, by the credit management unit, an amount of credit in which each of the at least two domains retains according to the characteristic of the task, and determining, by the scheduler, an application frequency of a (Continued)

boost mechanism applied to the at least two domains according to the amount of credit.

15 Claims, 5 Drawing Sheets

(56) References Cited

U.S. PATENT DOCUMENTS

| | | | | |
|---|---|---|---|---|
| 8,255,910 | B2* | 8/2012 | Cherkasova | G06F 9/4881 370/395.4 |
| 8,499,303 | B2 | 6/2013 | Krishnakumar et al. | |
| 10,102,025 | B2* | 10/2018 | Ansari | G06F 9/45558 |
| 2008/0022280 | A1* | 1/2008 | Cherkasova | G06F 9/4881 718/102 |
| 2011/0035752 | A1* | 2/2011 | Krishnakumar | G06F 9/4881 718/103 |
| 2015/0339170 | A1* | 11/2015 | Guan | G06F 9/4881 718/104 |

OTHER PUBLICATIONS

Hwang et al.. "Virtual machine scheduling based on task characteristic", Apr. 2016, In Proceedings of the 31st Annual ACM Symposium on Applied Computing, pp. 1897-1899 (Year: 2016).*

Eunji Yang et al., "A Priority Allocation Scheme Conisdering Virtual Machine Scheduling Delays in Xen Enviornments" Journal of KIISE:Computer Systems and Theory, Korean Institute of Information Scientists and Engineers, vol. 37, Issue 4, 2010, pp. 246-255.

Hyun-Jun Yun et al., " a Cpu Allocation Method Considering the Control Domain Overhead in Xen Virtualization Environment" Journal of KIISE:Computer Systems and Theory, Korean Institute of Information Scientists and Engineers, vol. 39, Issue 1, Feb. 2012, pp. 1-11.

Young Jun Yoo et al. "Low Latency Task Scheduling Mechanism on Xen Virtual Machines", Life Science Journal, 2014; 11(7) p. 721-725 (May 26, 2014).

Byung Ki Kim et al. "Scheduling Mechanism for Supporting Latency Sensitive Domains in Xen Virtualization", Journal of Korean Institute of Information Technology, vol. 10, No. 11, pp. 135-141 (Nov. 2012).

* cited by examiner

METHOD, NON-TRANSITORY COMPUTER READABLE RECORDING MEDIUM, AND APPARATUS FOR SCHEDULING VIRTUAL MACHINE MONITOR

CROSS-REFERENCE TO RELATED APPLICATION

This application claims priority to Korean Patent Application No. 10-2015-0190583, filed on Dec. 31, 2015, the disclosure of which is incorporated herein by reference in its entirety.

BACKGROUND

The present disclosure relates to a method, non-transitory computer readable recording medium, and apparatus for scheduling virtual machine monitor, and more particularly, relates to a method, non-transitory computer readable recording medium, and apparatus for scheduling virtual machine monitor for reducing an input/output (I/O) event delay of scheduling.

Virtualization technology refers to the technology of efficiently using a resource by integrating a plurality of physical resources into a logical resource, or on the contrary, dividing a single physical resource into a plurality of logical resources. The virtualization technology may operate a plurality of systems in a single machine by introducing a virtualization layer. The software of abstracting the physical resource is referred to as a virtual machine monitor or a hypervisor, and there are well-known virtual machine monitors such as Hyper-V, VirtualBox, VMware, Xen, Kernel-based Virtual Machine (KVM), etc.

The virtual machine refers a logical resource abstracted by a virtual machine monitor, that is, the virtual machine does not mean an actual machine but means a machine environment in which a physical machine is likely to exist, and in Xen, the virtual machine may be referred to as a domain. A relationship between the virtual machine monitor and the virtual machine is similar to a relationship between an operating system and a processor. The operating system provides an abstracted physical resource to a plurality of processors by abstracting the physical resource, and similarly, the virtual machine monitor provides virtualized physical resources to the virtual machine by virtualizing a central processing unit (CPU), a memory, and an input/output (I/O).

The virtualized CPU (VCPU) refers to the virtual machine monitor logically abstracting the CPU which is an actual physical resource, and a plurality of virtual machines operating in a single physical machine have not the actual CPU but the VCPU. The VCPU corresponds to the processor in the relationship between the operating system and processor, and the virtual machine monitor also selects the VCPU which is to use the CPU resource through a scheduling policy as if the operating system selects the processor which is to use the CPU resource. As such, scheduling of determining the VCPU which is to use the CPU resource is referred to as virtual machine scheduling.

A credit scheduler is one of the virtual machine scheduling methods of Xen which is a Linux open resource, and uses a boost mechanism in order to improve event responsiveness. The boost mechanism changes a state of a corresponding VCPU into an executable state when an event is delayed in the VCPU which is in a block state, and allocates BOOST which is the highest priority. The corresponding VCPU is in a block state when there is no executable task in a domain or the VCPU holds a specific value or more credit since a credit is not consumed, and is not executed until the event is generated. The VCPU having BOOST which is the highest priority is preferentially executed, and improves the responsiveness of the domain by rapidly processing the delayed event.

However, since the VCPU performing a CPU-intensive operation continuously consumes the credit and a probability in which an executable task exists in the domain is high, the VCPU cannot receive a benefit of a conventional boost mechanism. Further, when there are a plurality of virtual machines which are in an active state, a virtual machine scheduling delay time is increased, and event responsiveness is further decreased. In a virtualization environment, since an interrupt generating in the I/O operation of the virtual machine is processed using an event mechanism, I/O performance as well as the I/O responsiveness may be decreased when the event responsiveness is decreased.

SUMMARY OF THE DISCLOSURE

The present disclosure is directed to providing a virtual machine monitor and a scheduling method thereof based on a characteristic of a task in order to solve decrease of input/output (I/O) performance of a domain performing a central processing unit (CPU)-intensive operation while having a great scheduling delay time in a virtual machine monitor and a scheduling method thereof.

According to one aspect of the present disclosure, a method for scheduling a virtual machine monitor having a scheduler, a task characteristic evaluation unit, and a credit management unit is provided. Here, the virtual machine monitor drives at least two domains. The method includes scheduling, by the scheduler, the at least two domains, if an I/O event of each of the at least two domains in which the scheduling is performed is delayed, evaluating, by the task characteristic evaluation unit, a characteristic of a task of the at least two domains based on at least one of a central processing unit (CPU) intensive degree and an input/output (I/O) intensive degree of the at least two domains, differentially determining, by the credit management unit, an amount of credit in which each of the at least two domains retains according to the characteristic of the task, and determining, by the scheduler, an application frequency of a boost mechanism applied to the at least two domains according to the amount of credit.

The CPU intensive degree is evaluated based on an index calculated by the Equation 1, and wherein the Equation 1 is $$cb_{i,j} = \frac{\text{credit\_line}_{default}}{n_{i,j}} \text{ credit/boost}$$

where $cb_{i,j}$ denotes the amount of credit in which $VCPU_i$ consumes by being boosted during $P_{i,j}$, $\text{credit\_line}_{default}$ denotes the amount of credit in which $VCPU_i$ gets a loan, and $n_{i,j}$ denotes the number of times being boosted.

The I/O intensive degree is evaluated based on an index calculated by the Equation 2, and wherein the Equation 2 is $$bm_{i,j} = \frac{n_{i,j}}{P_{i,j}} \text{ boost/ms}$$

where $P_{i,j}$ denotes a time taken until $VCPU_i$ completely consumes a loan credit for j period, $n_{i,j}$ denotes the number of times being boosted, and $bm_{i,j}$ denotes the number of times in which $VCPU_i$ is boosted per millisecond (ms) during $P_{i,j}$.

The task characteristic is evaluated based on an overall characteristic including the CPU intensive degree and the I/O intensive degree, and the overall characteristic is evaluated based on an index calculated by the Equation 3, and wherein the Equation 3 is $$cm_{i,j} = cb_{i,j} * bm_{i,j} = \frac{\text{credit\_line}_{i,j}}{n_{i,j}} * \frac{n_{i,j}}{\text{runtime}_{i,j}} \text{ credit/ms,}$$

where $cm_{i,j}$ denotes the amount of loan credit in which $VCPU_i$ consumes per ms, $\text{credit\_line}_{default}$ denotes the amount of credit in which VCPU gets a loan, $\text{runtime}_{i,j}$ denotes a time taken until $VCPU_i$ completely consumes the loan credit during j period, $n_{i,j}$ denotes the number of times being boosted, $cb_{i,j}$ denotes the amount of credit in which $VCPU_i$ consumes by being boosted during $P_{i,j}$, and $bm_i$ denotes the number of times in which $VCPU_i$ is boosted per millisecond (ms) during $P_{i,j}$.

The step of the differentially determining the amount of credit in which each of the at least two domains retains according to the characteristic of the task is further determined by the Equation 4, and wherein the Equation 4 is $$\text{credit\_boost}_{current+1} = \frac{\text{credit\_line}_{default}}{cm_{i,j}}$$

where $cm_{i,j}$ denotes the amount of loan credit in which $VCPU_i$ consumes per ms, $\text{credit\_line}_{default}$ denotes the amount of credit in which $VCPU_i$ gets a loan, $\text{credit\_boost}_{current+1}$ denotes the amount of credit which is able to get a loan in a next period (current+1) after repayment.

According to another aspect of the present disclosure, a non-transitory computer readable recording medium having stored thereon a computer program is provided. The computer program, when executed, causing a processor to implement a method for scheduling a virtual machine monitor comprising a scheduler, a task characteristic evaluation unit, and a credit management unit. The virtual machine monitor drives at least two domains, the method includes scheduling, by the scheduler, the at least two domains, if an I/O event of each of the at least two domains in which the scheduling is performed is delayed, evaluating, by the task characteristic evaluation unit, a characteristic of a task of the at least two domains based on at least one of a central processing unit (CPU) intensive degree and an input/output (I/O) intensive degree of the at least two domains, differentially determining, by the credit management unit, an amount of credit in which each of the at least two domains retains according to the characteristic of the task, and determining, by the scheduler, an application frequency of a boost mechanism applied to the at least two domains according to the amount of credit.

According to another aspect of the present disclosure, an apparatus having a virtual machine monitor driving at least two domains is provided. The apparatus includes a scheduler scheduling the at least two domains, a task characteristic evaluation unit, if an I/O event of each of the at least two domains in which the scheduling is performed is delayed, evaluating a characteristic of a task of the at least two domains based on at least one of a central processing unit (CPU) intensive degree and an input/output (I/O) intensive degree of the at least two domains, and a credit management unit differentially determining an amount of credit in which each of the at least two domains retains according to the characteristic of the task, wherein the scheduler determines an application frequency of a boost mechanism applied to the at least two domains according to the amount of credit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
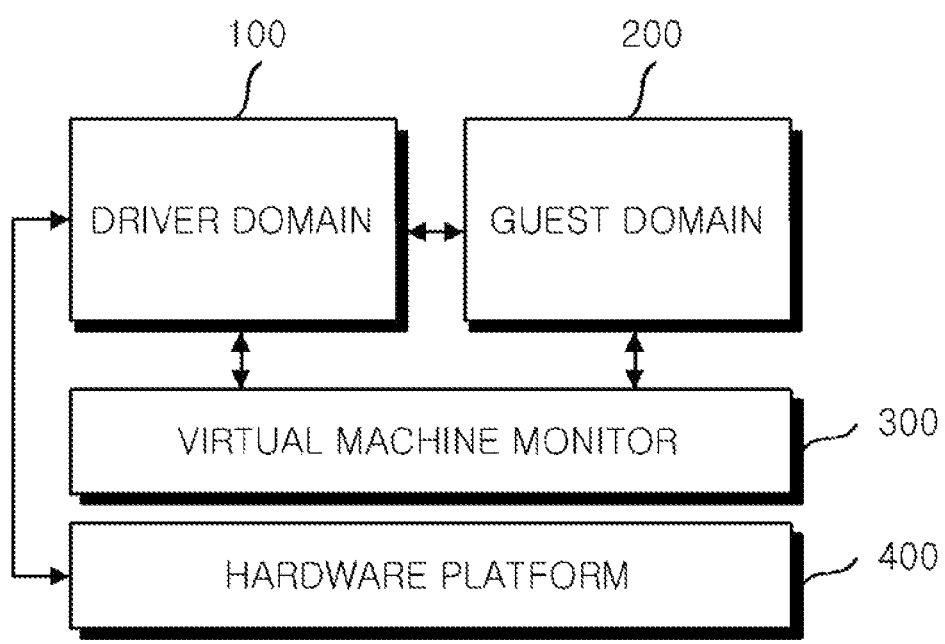
FIG. 1 illustrates a separate driver model including a virtual machine monitor according to one embodiment of the present disclosure.

Exemplary embodiments of the present disclosure are specific embodiments, and will be described in detail below with reference to the accompanying drawings. Exemplary embodiments of the present disclosure will be described below in sufficient detail to enable those of ordinary skill in the art to embody and practice the present disclosure. It should be understood that exemplary embodiments of the present disclosure are different from each other but are not mutually exclusive. For example, specific shape, structure, and characteristics described herein can be implemented as various embodiments without departing from the spirit and scope of the present disclosure. Further, it should be understood that a position and an arrangement of each of elements included in each embodiment are changed without departing from the spirit and scope of the present disclosure. Accordingly, the detailed description which will be described below should not be construed as limited, and when being properly described, the scope of the present disclosure is defined only by the appended claims together with every scope which is equivalent to the scope claimed in the claims. In the drawings, like reference numerals represent functions which are the same or similar in various aspects. Hereinafter, embodiments of the present disclosure will be described in detail with reference to the accompanying drawings.

FIG. 1 illustrates a separate driver model including a virtual machine monitor according to one embodiment of the present disclosure.

Referring to FIG. 1, a separate driver model may include a plurality of domains 100 and 200, a virtual machine monitor 300, and a hardware platform 400.

The domains 100 and 200 may not be an actual machine but be implemented by an operating system or an application program in order to provide an environment in which a physical machine is likely to exist. The domains 100 and 200 may be classified into a driver domain 100 and a guest domain 200, the driver domain 100 may be domains 100 and 200 which are able to exchange input/output (I/O) event information by directing accessing the hardware platform 400, and the guest domain 200 may be domains 100 and 200 indirectly using the hardware platform 400 by receiving a help from the driver domain 100.

The hardware platform 400 may be a physical device such as a central processing unit (CPU), a memory, an I/O port, etc., and directly exchange the I/O event information with the driver domain 100.

The virtual machine monitor 300 may be a platform for simultaneously operating the domains 100 and 200 in a single machine, and manage an abstracted hardware resource or distribute a resource to the domains through a virtual machine scheduler. That is, the virtual machine monitor 300 may be software enabling one computer to simultaneously drive a plurality of operating systems.

The virtual machine monitor 300 may use various virtual machine schedulers, and representatively, use a real time deferrable server (RTDS), an ARINC 653 scheduler, a Credit scheduler, and a Credit2 scheduler provided by a Xen project virtual machine monitor (VMM). Among them, the Credit scheduler may be a scheduler used for a general purpose, and be a proportional fair share scheduler distributing a CPU resource in proportion to a share in which the domains 100 and 200 have.

The Credit scheduler may distribute a credit to the VCPU of corresponding domains 100 and 200 in proportion to a weight value in which the domains 100 and 200 have every 30 ms, a priority of the VCPU may be determined according to a value of the credit in which the VCPU has, and the credit may be decreased as much as being executed.

The Credit scheduler may perform a boost mechanism for assigning a BOOST state, which has the highest priority, to the VCPU when the I/O event is delayed in the VCPU. In this case, the BOOST state may not be assigned to the VCPU of the domains 100 and 200 which are in an active state, since the boost mechanism assigns the BOOST state to the VCPU only when the I/O event is delayed in the VCPU of the domains 100 and 200 which are in an inactive state.

Accordingly, when the I/O event of the VCPU of the domains 100 and 200 is delayed, the present disclosure may increase the priority of the domains 100 and 200 corresponding to the delayed VCPU by applying a new boost mechanism, regardless of whether the domains 100 and 200 are activated. In this case, in order to avoid a situation in which the CPU resource is monopolized as a specific domain is continuously boosted, the new boost mechanism, which is differentially applying the frequency of application of the boost mechanism according to the I/O event delay, may be applied according to a characteristic of a task of the domains 100 and 200. In more detail, in the domains 100 and 200 in each of which the I/O event is first delayed or which are in the inactive state, the boost mechanism may be applied to the domains 100 and 200 without changing the application frequency of the boost mechanism, and in the domains 100 and 200 which are in the active state, a modified boost mechanism may be applied to the domains 100 and 200 by decreasing the application frequency of the boost mechanism.

For this, the virtual machine monitor 300 of the present disclosure may execute a credit loan/repayment mechanism, evaluate a CPU-intensive degree and an I/O-intensive degree of the task of the domains 100 and 200 using the loan/repayment mechanism, calculate the amount of credit in which the domains 100 and 200 are able to get a loan based on the evaluated CPU and I/O-intensive degrees, and execute a new boost mechanism in which the frequency boosted according to the characteristic of the task is controlled using the amount of calculated credit in which the domains 100 and 200 are able to get a loan.

The virtual machine monitor 300 will be described in detail with reference to FIG. 2.

Figure 2:
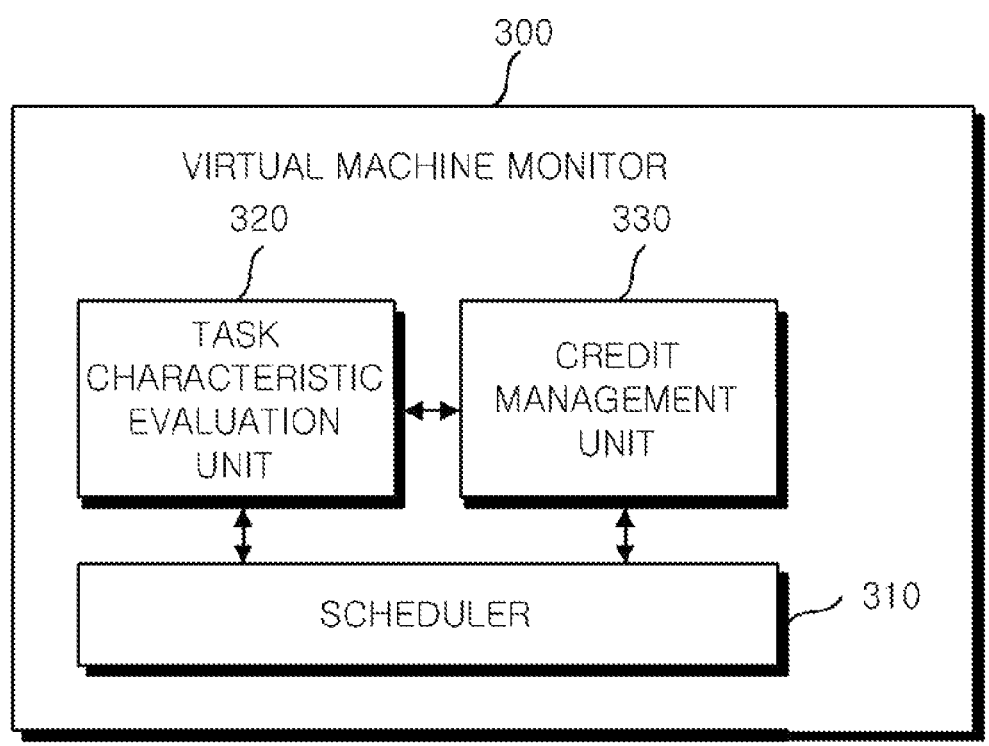
FIG. 2 is a control block diagram of the virtual machine monitor shown in FIG. 1.

Referring to FIG. 2, the virtual machine monitor 300 may include a scheduler 310, a task characteristic evaluation unit 320, and a credit management unit 330. The task characteristic evaluation unit 320 may classify whether a task of the domains 100 and 200 is CPU-intensive or I/O-intensive, and evaluate the CPU-intensive degree and the I/O-intensive degree.

In more detail, the scheduler 310 may lend a loan credit corresponding to as much as a predetermined credit_$line_{default}$ to the VCPU and apply a boost mechanism when an I/O event is first delayed in the VCPU of the domains 100 and 200. The scheduler 310 may decrease the loan credit as much as the VCPU is executed by being boosted. In this case, the loan credit may be decreased only when the VCPU is executed by being boosted due to an I/O event delay, and the boost mechanism by the I/O event may be applied only when the loan credit is left. The scheduler 310 may calculate a duration of time (hereafter, simply referred to as "time $P_{i,j}$" taken until the VCPU completely consumes the loan credit during j period (j is a period which is from a use start to a consumption completion of the loan credit), the number of times being boosted $n_{i,j}$, and the amount of credit consumed while the VCPU is executed by being boosted. The scheduler 310 may transmit the time $P_{i,j}$, the number of times being boosted $n_{i,j}$, and the amount of credit consumed while the VCPU is boosted and executed to the task characteristic evaluation unit 320.

The task characteristic evaluation unit 320 according to an embodiment of the present disclosure may evaluate the characteristic of the task using a credit loan/repayment mechanism.

First, the characteristic of the task will be described. The characteristic of the task may classify whether the task of the domains 100 and 200 is CPU-intensive or I/O-intensive, a CPU resource may be occupied for a long time when a scheduling is performed as the task is CPU-intensive, and the I/O event is often generated as the task is I/O-intensive. That is, since the CPU resource is occupied for a long time as the CPU-intensive degree is high when the task is CPU-intensive, the CPU resource is monopolized when being boosted, and since the domain performing the task which is I/O-intensive is frequently boosted by frequently generating the I/O event as the I/O-intensive degree is high when the task is I/O-intensive, the CPU resource is monopolized.

Further, the characteristic of the task may be classified by determining overall whether the task is CPU-intensive or I/O-intensive. The characteristic of the task will be described using a classification graph shown in FIG. 3.

Figure 3:
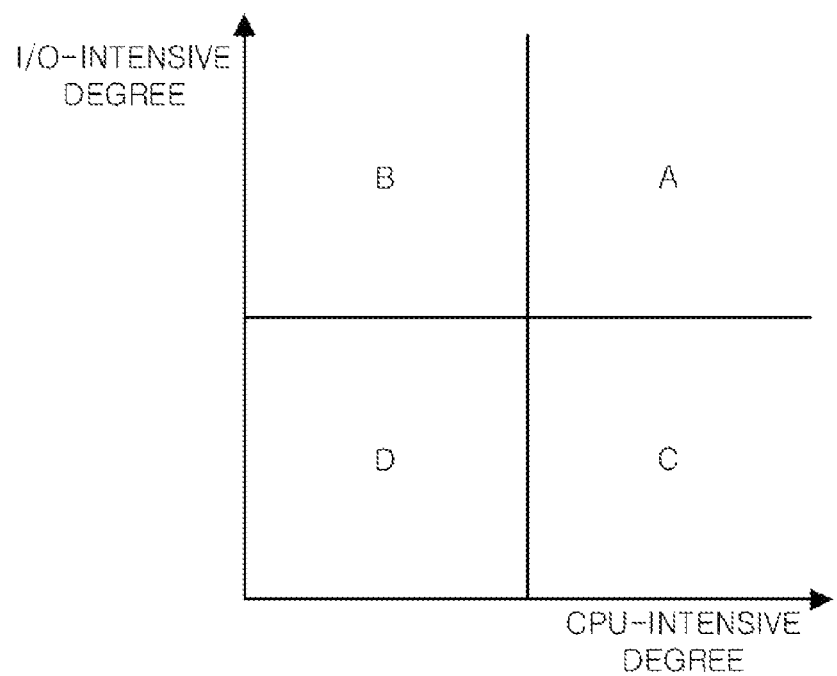
FIG. 3 is a task classification graph according to a central processing unit (CPU)-intensive degree and an input/output (I/O)-intensive degree according to an embodiment of the present disclosure.

Referring to FIG. 3, the characteristic of the task may be classified into A, B, C, and D types as in a classification graph shown in FIG. 3 according to the CPU-intensive and I/O-intensive degrees. An X axis of the classification graph may mean the CPU-intensive degree, and a Y axis may mean the I/O-intensive degree. For example, when an arbitrary task has high CPU-intensive and I/O-intensive degrees, the characteristic of the task may be classified as the A type, when the arbitrary task has a low CPU-intensive degree and a high I/O-intensive degree, the characteristic of the task may be classified as the B type. The characteristic of the task may have a great monopoly power on the CPU resource in the order of A>B=C>D. The I/O event delay may be generated when the specific domains 100 and 200 monopolize the CPU resource, and the virtual machine monitor 300 to which the new boost mechanism is applied may decrease the application frequency of the boost mechanism to the domains 100 and 200 having a great monopoly power on the CPU resource by interacting with the scheduler 310, the task characteristic evaluation unit 320, and the credit management unit 330.

The task characteristic evaluation unit 320 evaluating the characteristic of the task using the credit loan/repayment mechanism will be described with reference to FIG. 4.

Figure 4:
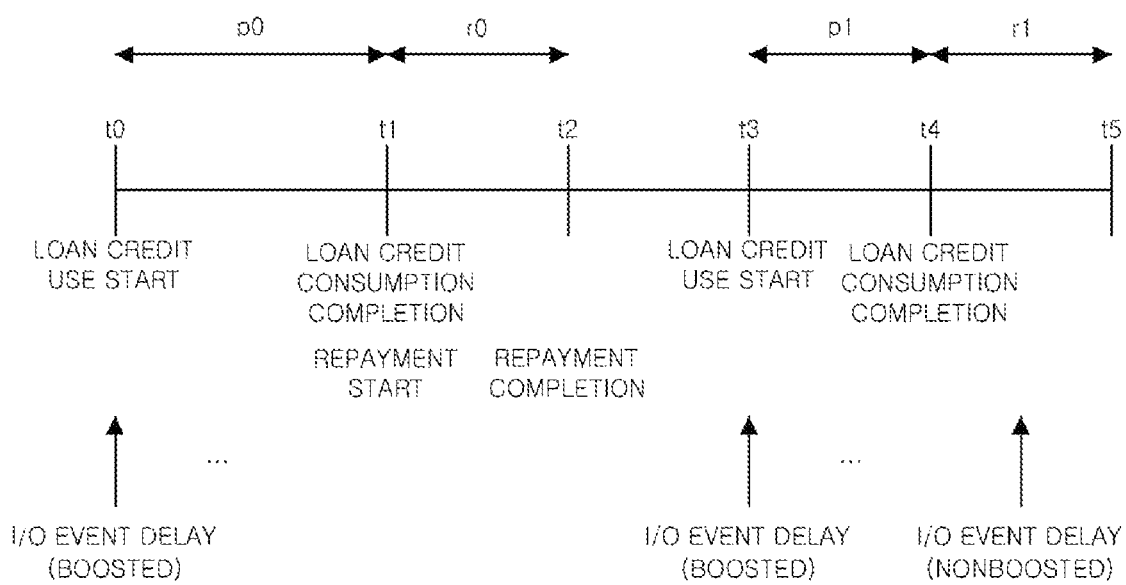
FIG. 4 illustrates a credit loan/repayment mechanism according to an embodiment of the present disclosure.

Referring to FIG. 4, the credit loan/repayment mechanism may lend an additional credit when the I/O event is first delayed in the domain and apply the boost mechanism, thereby improving I/O performance (t0 of FIG. 4). The loan credit may be decreased as much as the domains 100 and 200 are executed by being boosted due to the I/O event delay (p0 of FIG. 4). In this case, after completing scheduling on the domains 100 and 200 executed by being boosted, the credit may not be decreased any more. When the domains 100 and 200 completely consume the loan credit by being boosted, therefore, the domains 100 and 200 may not be boosted even when the I/O event is delayed until the loan credit is completely repaid (r0 of FIG. 4). In this case, the domains 100 and 200 may use the credit distributed according to their shares for repaying the loan credit.

Through the operation described above, the task characteristic evaluation unit 320 may evaluate the characteristic of the task by analyzing a consumption pattern of the loan credit and a repayment pattern of the loan credit. In more detail, the task characteristic evaluation unit 320 may evaluate the task to be CPU-intensive or I/O-intensive as the domains consume the loan credit quickly, and evaluate the task to be idle as the repayment of the loan credit is fast.

The task characteristic evaluation unit 320 may evaluate the CPU-intensive degree and the I/O-intensive degree for classifying the characteristic of the task using the credit loan/repayment mechanism. In this case, the credit loan/repayment mechanism may be performed by the scheduler 310, and the task characteristic evaluation unit 320 may receive information needed for evaluating the CPU-intensive degree from the scheduler 310.

The task characteristic evaluation unit 320 may receive a time $P_{i,j}$ taken and the number of times being boosted $n_{i,j}$ until $VCPU_i$ completely consumes the loan credit during j period, and credit_line$_{default}$ (i is the number of times being boosted, and j is a period which is from a use start to a consumption completion of the loan credit) which is the amount of credit in which $VCPU_i$ gets a loan, which are obtained by the scheduler 310 from the scheduler 310, evaluate the CPU-intensive degree using a predetermined [Equation 1], and evaluate the I/O-intensive degree using a predetermined [Equation 2]. The Equations are as follows.

$$cb_{i,j} = \frac{credit\_line_{default}}{n_{i,j}} \text{ credit/boost} \quad [\text{Equation 1}]$$

(Here, $cb_{i,j}$: the amount of credit in which $VCPU_i$ consumes by being boosted during $P_{i,j}$, credit_line$_{default}$: the amount of credit in which $VCPU_i$ gets a loan, $n_{i,j}$: the number of times being boosted)

$$bm_{i,j} = \frac{n_{i,j}}{P_{i,j}} \text{ boost/ms} \quad [\text{Equation 2}]$$

(Here, $P_{i,j}$: a time taken until $VCPU_i$ completely consumes a loan credit for j period, $n_{i,j}$: the number of times being boosted, $bm_{i,j}$: the number of times in which $VCPU_i$ is boosted per millisecond (ms) during $P_{i,j}$)

$cb_{i,j}$ calculated by Equation 1 may be used for evaluating the CPU-intensive degree of the task. For example, it may mean that the task consumes a lot of the credit while being executed by being boosted as a value of $cb_{i,j}$ is great. That is, it may mean that the task is CPU-intensive.

$bm_{i,j}$ calculated by Equation 2 may be used for evaluating the I/O-intensive degree of the task. For example, it may mean that a lot of I/O events are generated as a value of $bm_{i,j}$ is great. That is, it may mean that the task is I/O-intensive.

Further, the task characteristic evaluation unit 320 may evaluate an overall characteristic including the CPU-intensive degree and the I/O-intensive degree, and the overall characteristic may be evaluated using [Equation 3]. Equation 3 is as follows.

$$cm_{i,j} = cb_{i,j} * bm_{i,j} = \frac{credit\_line_{i,j}}{n_{i,j}} * \frac{n_{i,j}}{runtime_{i,j}} \text{credit/ms} \quad [\text{Equation 3}]$$

(Here, $cm_{i,j}$: the amount of loan credit in which $VCPU_i$ consumes per ms, credit_line$_{default}$: the amount of credit in which VCPU gets a loan, runtime$_{i,j}$: a time taken until $VCPU_i$ completely consumes the loan credit during j period, $n_{i,j}$: the number of times being boosted, $cb_{i,j}$: the amount of credit in which $VCPU_i$ consumes by being boosted during $P_{i,j}$, $bm_{i,j}$: the number of times in which $VCPU_i$ is boosted per ms during $P_{i,j}$)

The task characteristic evaluation unit 320 may classify the characteristic of the task of the domains 100 and 200 using the CPU-intensive degree, the I/O-intensive degree, or the overall characteristic, and transmit the classification information including the CPU-intensive degree, the I/O-intensive degree, or the overall characteristic to the credit management unit 330.

The credit management unit 330 may determine the amount of credit which is able to get a loan for differentially applying the boost mechanism according to the characteristic of the task of the domains 100 and 200. In this case, the amount of credit which is able to get a loan may correspond to the amount of credit in a next period (current+1) after completely repaying the loan credit at a time through the BOOST. The amount of credit which is currently able to get a loan may be calculated using [Equation 4], and Equation 4 is as follows.

$$credit\_boost_{current+1} = \frac{credit\_line_{default}}{cm_{i,j}} \quad [\text{Equation 4}]$$

(Here, $cm_{i,j}$: the amount of loan credit in which $VCPU_i$ consumes per ms, credit_line$_{default}$: the amount of credit in which $VCPU_1$ gets a loan, credit_boost$_{current+1}$: the amount of credit which is able to get a loan in a next period (current+1) after repayment)

According to Equation 4, the amount of credit which is able to get a loan in a next period after the repayment may be influenced by $cm_{i,j}$ of a past period (a previous period).

That is, the amount of credit which is able to get a loan in the next period may be decreased as the characteristic of the task is close to the A type shown in FIG. 2, and on the contrary, the amount of credit which is able to get a loan in the next period may be increased as the characteristic of the task is close to the D type shown in FIG. 2. Since that the credit which is able to get a loan is increased may mean that the credit which has to be repaid is increased, a repayment period may be increased, and the frequency in which the domains 100 and 200 having a great monopoly power of the CPU resource are boosted may be decreased.

The credit management unit 330 according to another embodiment may calculate the amount of credit which is currently able to get a loan using the CPU-intensive degree and the I/O-intensive degree.

The credit management unit 330 may transmit the amount of credit which is currently able to get a loan to the scheduler 310.

The scheduler 310, the task characteristic evaluation unit 320, and the credit management unit 330 according to an embodiment of the present disclosure may not be operated separately, and may be operated by interacting with each other.

Figure 5:
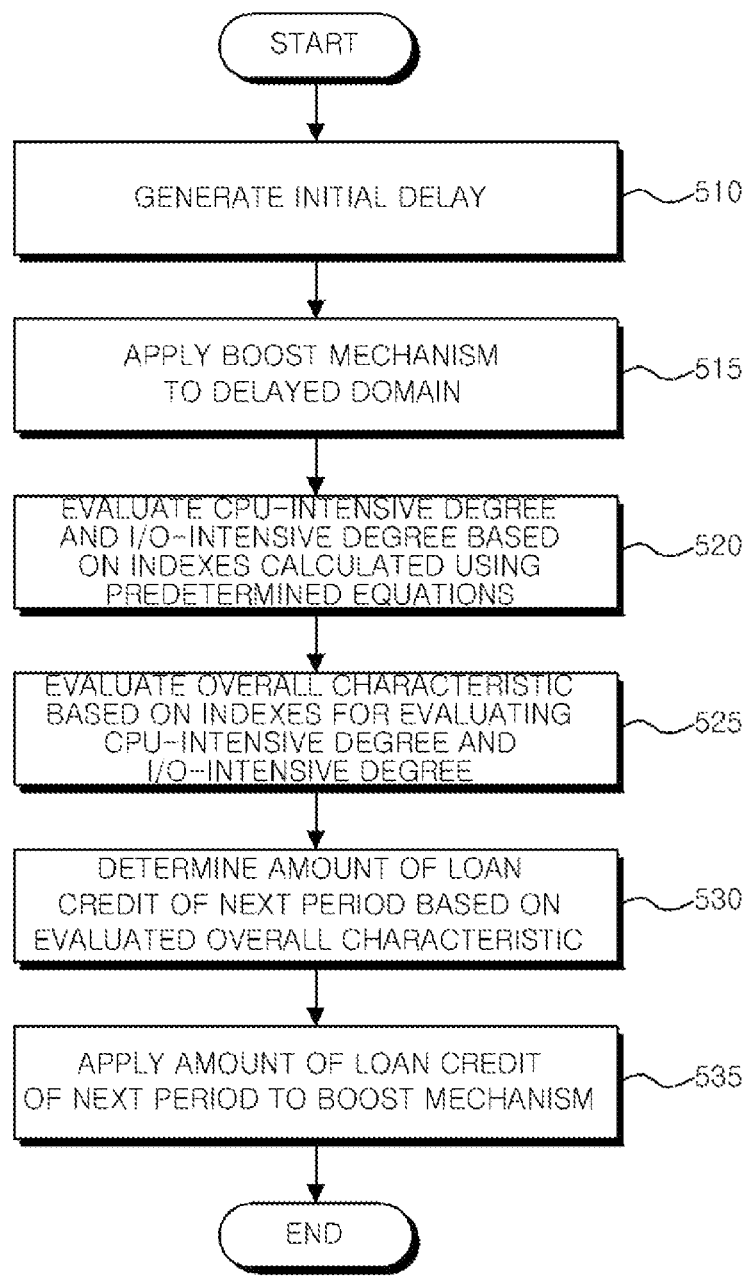
FIG. 5 is a flowchart for describing a scheduling method of a virtual machine monitor according to the embodiment of the present disclosure.

FIG. 5 is a flowchart for describing a scheduling method of a virtual machine monitor according to an embodiment of the present disclosure.

First, when an initial I/O event delay is generated in the domains 100 and 200 (S510), the scheduler 310 of the virtual machine monitor 300 may apply the boost mechanism to the domains 100 and 200 in which the I/O event is delayed (S515). The applied boost mechanism may be a boost mechanism in which the credit loan/repayment mechanism is applied, and since the mechanism is descried above, a detailed description will be omitted.

The task characteristic evaluation unit 320 of the virtual machine monitor 300 may receive a time $P_{i,j}$ taken and the number of times being boosted $n_{i,j}$ until the VCPU completely consumes the loan credit during j period, and the amount of credit consumed while the VCPU is executed by being boosted from the credit loan/repayment mechanism executed by the scheduler 310, and evaluate the CPU-intensive degree and the I/O-intensive degree based on the received information (S520). Further, the task characteristic evaluation unit 320 may evaluate an overall characteristic based on an evaluation index representing the evaluated CPU-intensive and I/O-intensive degrees (S530). The CPU-intensive degree and the I/O-intensive degree, and the overall characteristic which are described above may be evaluated based on the indexes calculated using Equations 1, 2, and 3, respectively, which is described above. The evaluated overall characteristic may be transmitted to the credit management unit 330.

The credit management unit 330 may calculate the amount of loan credit of a next period based on the received overall characteristic (S530). The amount of loan credit of the next period may be calculated using Equation 4, which is described above.

The credit management unit 330 may transmit the current amount of loan credit which is calculated to the scheduler 310, and the scheduler 310 may execute the boost mechanism by applying the amount of loan credit of the next period to the credit loan/repayment mechanism (S535).

As such, the virtual machine monitor 300 and the scheduling method of the virtual machine monitor 300 may be recorded in a computer-readable recording medium by being implemented in a form of program instructions capable of being executed through various computer components. The computer-readable recording medium may include program instructions, data files, data structures, etc. alone or in combination.

The program instructions which are recorded in the computer-readable recording medium may be specially designed and configured for the present disclosure or may be known to and be used for one of ordinary skill in the art. Examples of the computer-readable recording medium may include a magnetic medium such as a hard disk, a floppy disk and a magnetic tape, an optical recording medium such as a compact disc (CD)-read only memory (ROM) and a digital video disc (DVD), a magneto-optical medium such as a floptical disk, and a hardware device which is specially configured to store and perform program instructions such as a ROM, a random access memory (RAM), and a flash memory, etc.

Examples of the program instructions may include high-level language codes which are executable by a computer using an interpreter, etc. as well as machine language codes which are made by a compiler. The hardware device may be configured to operate as at least one software module in order to perform the operation according to the present disclosure, and vice versa.

According to the above-described embodiments of the present disclosure, the virtual machine monitor and the scheduling method of the virtual machine monitor may improve the I/O performance of the domain which is in the active state by assigning a separate credit for processing the I/O event and assigning a much more CPU resource for the I/O processing.

It will be apparent to those skilled in the art that various modifications can be made to the above-described embodiments of the present disclosure without departing from the spirit or scope of the disclosure. Thus, it is intended that the present disclosure covers all such modifications provided they come within the scope of the appended claims and their equivalents.

What is claimed is:

1. A method for scheduling virtual machines driven by a virtual machine monitor comprising a scheduler, a task characteristic evaluation unit, and a credit management unit, wherein the virtual machine monitor drives at least two virtual machines, the method comprising:
   scheduling, by the scheduler, the at least two virtual machines;
   when an I/O event of each of the at least two virtual machines in which the scheduling is performed is delayed, determining, by the task characteristic evaluation unit, a central processing unit (CPU) intensive degree and an input/output (I/O) intensive degree of the at least two virtual machines using information received from the scheduler, the information specifying at least a time until all borrowed credits are consumed, a number of times being boosted, and an amount of time in which a virtual CPU (VCPU) gets a loan;
   evaluating, by the task characteristic evaluation unit, a characteristic of a task of the at least two virtual machines based on at least the CPU intensive degree and the I/O intensive degree of the at least two virtual machines;
   determining, by the credit management unit, an amount of credit, which each of the at least two virtual machines retains, according to the characteristic of the task; and
   determining, by the scheduler, a first frequency of application of a boost mechanism to be applied to the at least two virtual machines based on the amount of credit, wherein in the at least two virtual machines in each of which the I/O event is delayed or in the at least two virtual machines which are in an inactive state, the boost mechanism is applied to the at least two virtual machines with the first frequency of application, wherein in the at least two virtual machines which are in an active state, the boost mechanism is applied to the at least two virtual machines with a second frequency of application less than the first frequency of application, wherein the evaluating the characteristic of the task of the at least two virtual machines comprises a credit loan/repayment mechanism, through which a loan credit is given to the at least two virtual machines when the I/O event is first delayed, and the loan credit is decreased as much as the at least virtual machines are boosted due to the I/O event delay, and wherein, when the at least two virtual machines completely consume the loan credit by being boosted, the at least two virtual machines are not boosted even when the I/O event is delayed until the loan credit is repaid.

2. The method of claim 1, wherein the CPU intensive degree is evaluated based on an index calculated by the Equation 1, and wherein the Equation 1 is $$cb_{i,j} = \frac{credit\_line_{default}}{n_{i,j}} credit/boost$$

where $cb_{i,j}$ denotes the amount of credit in which $VCPU_i$ consumes by being boosted during $P_{i,j}$, $credit\_line_{default}$ denotes the amount of credit in which $VCPU_i$ gets a loan, and $n_{i,j}$ denotes the number of times being boosted.

3. The method of claim 1, wherein the I/O intensive degree is evaluated based on an index calculated by the Equation 2, and wherein the Equation 2 is $$bm_{i,j} = \frac{n_{i,j}}{P_{i,j}} boost/ms$$

where $P_{i,j}$ denotes a time taken until $VCPU_i$ completely consumes a loan credit for j period, $n_{i,j}$ denotes the number of times being boosted, and $bm_{i,j}$ denotes the number of times in which $VCPU_i$ is boosted per millisecond (ms) during $P_{i,j}$.

4. The method of claim 1, wherein the task characteristic is evaluated based on an overall characteristic including the CPU intensive degree and the I/O intensive degree, and the overall characteristic is evaluated based on an index calculated by the Equation 3, and wherein the Equation 3 is $$cm_{i,j} = cb_{i,j} * bm_{i,j} = \frac{credit\_line_{i,j}}{n_{i,j}} * \frac{n_{i,j}}{runtime_{i,j}} credit/ms,$$

where $cm_{i,j}$ denotes the amount of loan credit in which $VCPU_i$ consumes per ms, $credit\_line_{default}$ denotes the amount of credit in which $VCPU_i$ gets a loan, $runtime_{i,j}$ denotes a time taken until $VCPU_i$ completely consumes the loan credit during j period, $n_{i,j}$ denotes the number of times being boosted, $cm_{i,j}$ denotes the amount of credit in which $VCPU_i$ consumes by being boosted during $P_{i,j}$, and $bm_{i,j}$ denotes the number of times in which $VCPU_i$ is boosted per millisecond (ms) during $P_{i,j}$.

5. The method of claim 4, wherein the step of the determining the amount of credit in which each of the at least two virtual machines retains according to the characteristic of the task is further determined by the Equation 4, and wherein the Equation 4 is $$credit\_boost_{current+1} = \frac{credit\_line_{default}}{cm_{i,j}}$$

where $cm_{i,j}$ denotes the amount of loan credit in which $VCPU_i$ consumes per ms, $credit\_line_{default}$ denotes the amount of credit in which $VCPU_i$ gets a loan, $credit\_boost_{current+1}$ denotes the amount of credit which is able to get a loan in a next period (current+1) after repayment.

6. A non-transitory computer readable recording medium having stored thereon a computer program, the computer program, when executed, causing a processor to implement a method for scheduling virtual machines driven by a virtual machine monitor comprising a scheduler, a task characteristic evaluation unit, and a credit management unit, wherein the virtual machine monitor drives at least two virtual machines, the method comprising:

scheduling, by the scheduler, the at least two virtual machines;

when an I/O event of each of the at least two virtual machines in which the scheduling is performed is delayed, determining, by the task characteristic evaluation unit, a central processing unit (CPU) intensive degree and an input/output (I/O) intensive degree of the at least two virtual machines using information received from the scheduler, the information specifying at least a time until all borrowed credits are consumed, a number of times being boosted, and an amount of time in which a virtual CPU (VCPU) gets a loan;

evaluating, by the task characteristic evaluation unit, a characteristic of a task of the at least two virtual machines based on at least the CPU intensive degree and the I/O intensive degree of the at least two virtual machines;

determining, by the credit management unit, an amount of credit, which each of the at least two virtual machines retains, according to the characteristic of the task; and determining, by the scheduler, a first frequency of application of a boost mechanism to be applied to the at least two virtual machines based on the amount of credit, wherein in the at least two virtual machines in each of which the I/O event is delayed or in the at least two virtual machines which are in an inactive state, the boost mechanism is applied to the at least two virtual machines with the first frequency of application, wherein in the at least two virtual machines which are in an active state, the boost mechanism is applied to the at least two virtual machines with a second frequency of application less than the first frequency of application, wherein the evaluating the characteristic of the task of the at least two virtual machines comprises a credit loan/repayment mechanism, through which a loan credit is given to the at least two virtual machines when the I/O event is first delayed, and the loan credit is decreased as much as the at least virtual machines are boosted due to the I/O event delay, and wherein, when the at least two virtual machines completely consume the loan credit by being boosted, the at least two virtual machines are not boosted even when the I/O event, is delayed until the loan credit is repaid.

7. The non-transitory computer readable recording medium of claim 6, wherein the CPU intensive degree is evaluated based on an index calculated by the Equation 1, and wherein the Equation 1 is $$cb_{i,j} = \frac{credit\_line_{default}}{n_{i,j}} credit/boost$$

where $cb_{i,j}$ denotes the amount of credit in which $VCPU_i$ consumes by being boosted during $P_{i,j}$, $credit\_line_{default}$ denotes the amount of credit in which $VCPU_i$ gets a loan, and $n_{i,j}$ denotes the number of times being boosted.

8. The non-transitory computer readable recording medium of claim 6, wherein the I/O intensive degree is evaluated based on an index calculated by the Equation 2, and wherein the Equation 2 is $$bm_{i,j} = \frac{n_{i,j}}{P_{i,j}} boost/ms$$

where $P_{i,j}$ denotes a time taken until $VCPU_i$ completely consumes a loan credit for j period, $n_{i,j}$ denotes the number of times being boosted, and $bm_{i,j}$ denotes the number of times in which $VCPU_i$ is boosted per millisecond (ms) during $P_{i,j}$.

9. The non-transitory computer readable recording medium of claim 6, wherein the task characteristic is evaluated based on an overall characteristic including the CPU intensive degree and the I/O intensive degree, and the overall characteristic is evaluated based on an index calculated by the equation 3, and wherein the Equation 3 is $$cm_{i,j} = cb_{i,j} * bm_{i,j} = \frac{credit\_line_{i,j}}{n_{i,j}} * \frac{n_{i,j}}{runtime_{i,j}} credit/ms,$$

where $cm_{i,j}$ denotes the amount of loan credit in which $VCPU_i$ consumes per ms, $credit\_line_{default}$ denotes the amount of credit in which $VCPU_i$ gets a loan, $runtime_{i,j}$ denotes a time taken until $VCPU_i$ completely consumes the loan credit during j period, $n_{i,j}$ denotes the number of times being boosted, $cm_{i,j}$ denotes the amount of credit in which $VCPU_i$ consumes by being boosted during $P_{i,j}$, and $bm_{i,j}$ denotes the number of times in which $VCPU_i$ is boosted per millisecond (ms) during $P_{i,j}$.

10. The non-transitory computer readable recording medium of claim 9, wherein the step of the determining the amount of credit in which each of the at least two domains virtual machines retains according to the characteristic of the task is further determined by the Equation 4, and wherein the Equation 4 is $$credit\_boost_{current+1} = \frac{credit\_line_{default}}{cm_{i,j}}$$

where $cm_{i,j}$ denotes the amount of loan credit in which $VCPU_i$ consumes per ms, $credit\_line_{default}$ denotes the amount of credit in which $VCPU_i$ gets a loan, $credit\_boost_{current+1}$ denotes the amount of credit which is able to get a loan in a next period (current+1) after repayment.

11. An apparatus having a virtual machine monitor driving at least two virtual machines, the apparatus comprising:
a scheduler configured to schedule the at least two virtual machines;
a task characteristic evaluation processor configured to:
when an I/O event of each of the at least two virtual machines in which the scheduling is performed is delayed, determine a central processing unit (CPU) intensive degree and an input/output (I/O) intensive degree of the at least two virtual machines using information received from the scheduler, the information specifying at least a time until all borrowed credits are consumed, a number of times being boosted, and an amount of time in which a virtual CPU (VCPU) gets a loan, and
evaluate a characteristic of a task of the at least two virtual machines based on at least the CPU intensive degree and the I/O intensive degree of the at least two virtual machines; and
a credit management processor configured to determine an amount of credit, which each of the at least two virtual machines retains, according to the characteristic of the task,
wherein the scheduler determines a first frequency of application of a boost mechanism to be applied to the at least two virtual machines based on the amount of credit,
wherein in the at least two virtual machines in each of which the I/O event is delayed or in the at least two virtual machines which are in an inactive state, the boost mechanism is applied to the at least two virtual machines with the first frequency of application,
wherein in the at least two virtual machines which are in an active state, the boost mechanism is applied to the at least two virtual machines with a second frequency of application less than the first frequency of application,
wherein the evaluating the characteristic of the task of the at least two virtual machines comprises a credit loan/repayment mechanism, through which a loan credit is given to the at least two virtual machines when the I/O event is first delayed, and the loan credit is decreased as much as the at least virtual machines are boosted due to the I/O event delay, and
wherein, when the at least two virtual machines completely consume the loan credit by being boosted, the at least two virtual machines are not boosted even when the I/O event is delayed until the loan credit is repaid.

12. The apparatus of claim 11, wherein the CPU intensive degree is evaluated based on an index calculated by the Equation 1, and wherein the Equation 1 is $$cb_{i,j} = \frac{credit\_line_{default}}{n_{i,j}} credit/boost$$

where $cb_{i,j}$ denotes the amount of credit in which $VCPU_i$ consumes by being boosted during $P_{i,j}$, $credit\_line_{default}$ denotes the amount of credit in which $VCPU_i$ gets a loan, and $n_{i,j}$ denotes the number of times being boosted.

13. The apparatus of claim 11, wherein the I/O intensive degree is evaluated based on an index calculated by the Equation 2, and wherein the Equation 2 is $$bm_{i,j} = \frac{n_{i,j}}{P_{i,j}} boost/ms$$

where $P_{i,j}$ denotes a time taken until $VCPU_i$ completely consumes a loan credit for j period, $n_{i,j}$ denotes the number of times being boosted, and $bm_{i,j}$ denotes the number of times in which $VCPU_i$ is boosted per millisecond (ms) during $P_{i,j}$.

14. The apparatus of claim 11, wherein the task characteristic is evaluated based on an overall characteristic including the CPU intensive degree and the I/O intensive degree, and the overall characteristic is evaluated based on an index calculated by the Equation 3, and wherein the Equation 3 is $$cm_{i,j} = cb_{i,j} * bm_{i,j} = \frac{\text{credit\_line}_{i,j}}{n_{i,j}} * \frac{n_{i,j}}{\text{runtime}_{i,j}} \text{credit/ms},$$

where $cm_{i,j}$ denotes the amount of loan credit in which $VCPU_i$ consumes per ms, $\text{credit\_line}_{default}$ denotes the amount of credit in which $VCPU_i$ gets a loan, $\text{runtime}_{i,j}$ denotes a time taken until $VCPU_i$ completely consumes the loan credit during j period, $n_{i,j}$ denotes the number of times being boosted, $cm_{i,j}$ denotes the amount of credit in which $VCPU_i$ consumes by being boosted during $P_{i,j}$, and $bm_{i,j}$ denotes the number of times in which $VCPU_i$ is boosted per millisecond (ms) during $P_{i,j}$.

15. The apparatus of claim 14, wherein the credit management unit determines the amount of credit by using the Equation 4, and wherein the Equation 4 is $$\text{credit\_boost}_{current+1} = \frac{\text{credit\_line}_{default}}{cm_{i,j}}$$

where $cm_{i,j}$ denotes the amount of loan credit in which $VCPU_i$ consumes per ms, $\text{credit\_line}_{default}$ denotes the amount of credit in which $VCPU_i$ gets a loan, $\text{credit\_boost}_{current+1}$ denotes the amount of credit which is able to get a loan in a next period (current+1) after repayment.

* * * * *